Feb. 1, 1938. B. PALM 2,107,210
ELEVATOR CONSTRUCTION
Filed May 18, 1932 6 Sheets-Sheet 3
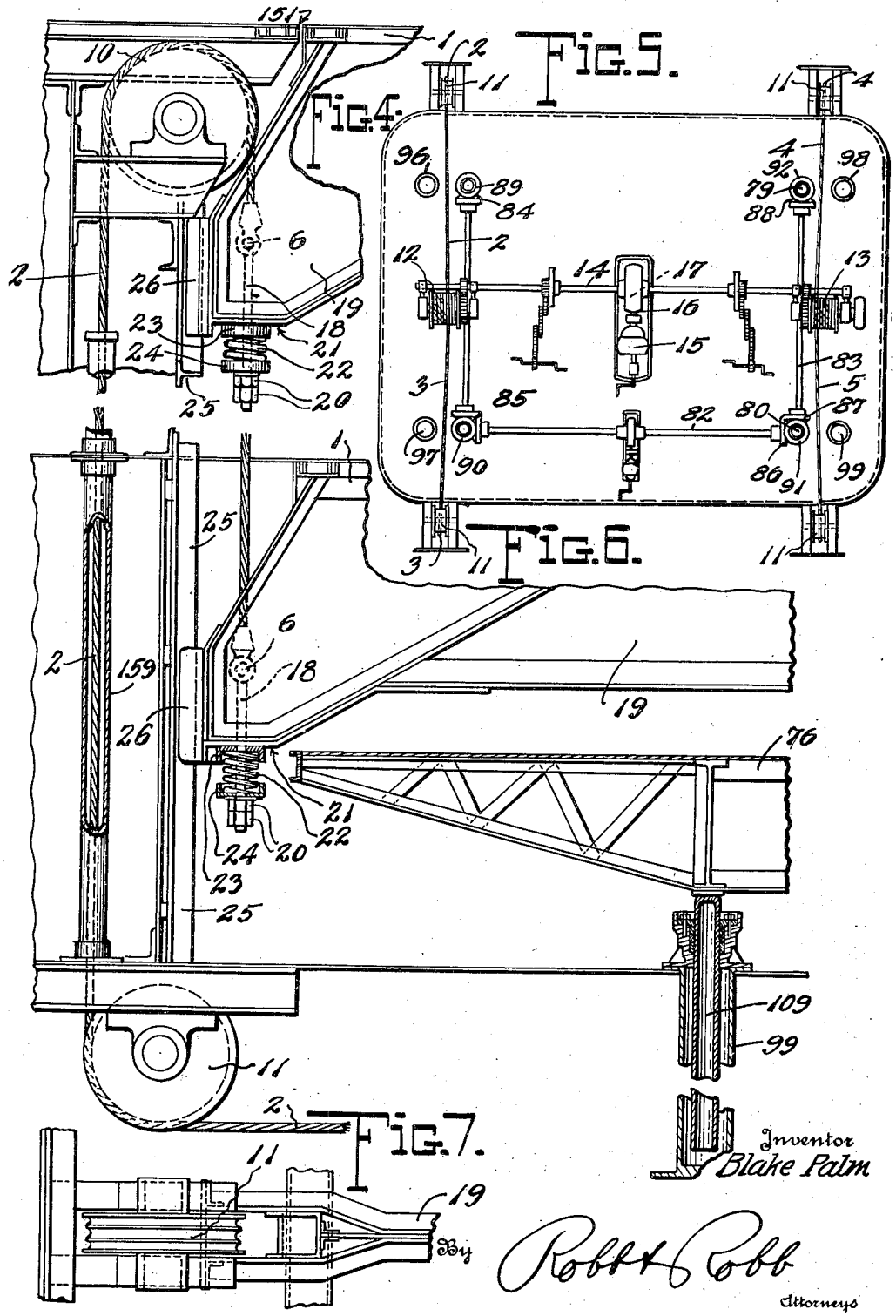

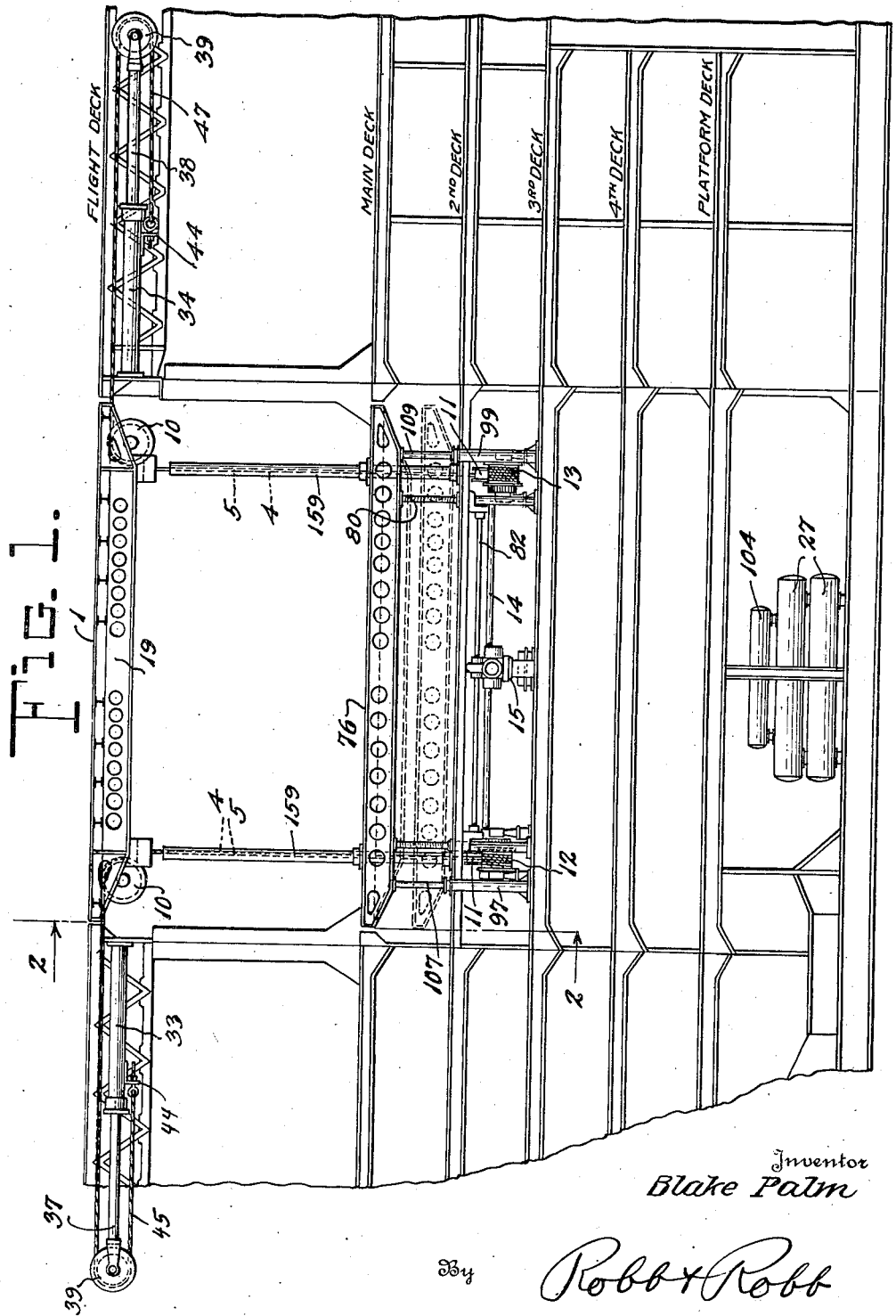

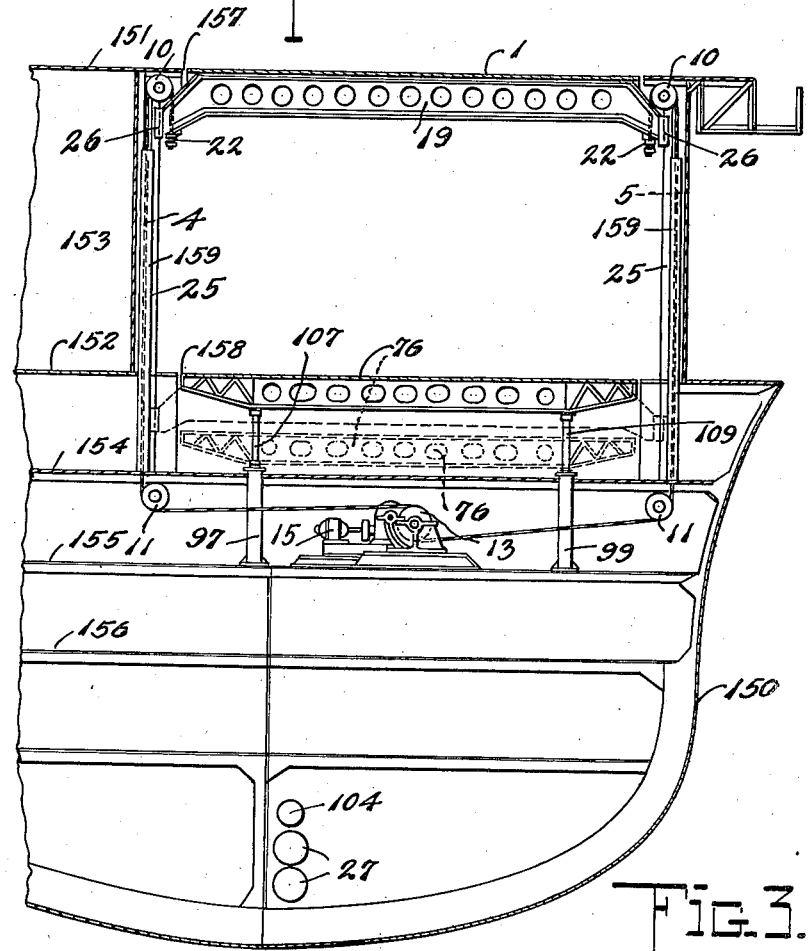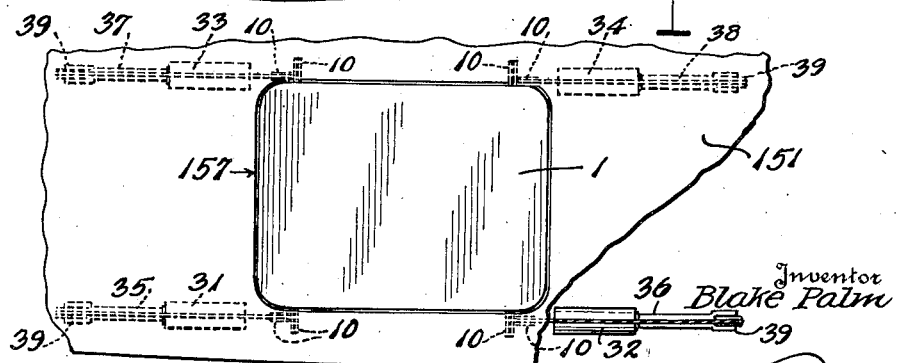

Feb. 1, 1938. B. PALM 2,107,210
ELEVATOR CONSTRUCTION
Filed May 18, 1932 6 Sheets-Sheet 4

Inventor
Blake Palm
By Robb & Robb
Attorneys

Feb. 1, 1938.      B. PALM      2,107,210
ELEVATOR CONSTRUCTION
Filed May 18, 1932      6 Sheets-Sheet 5
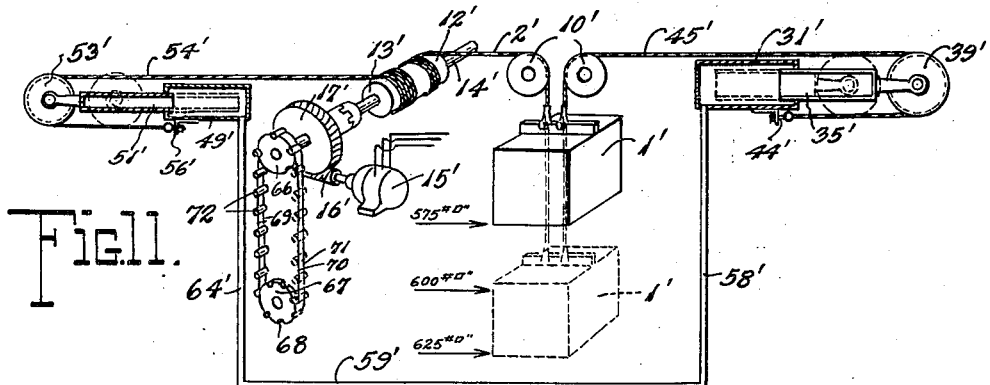
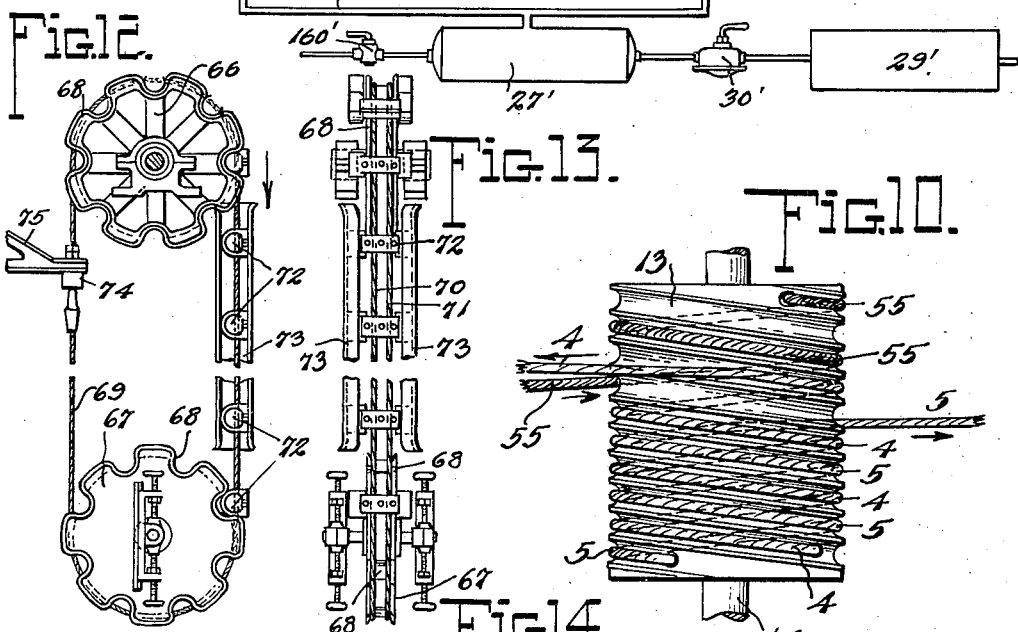
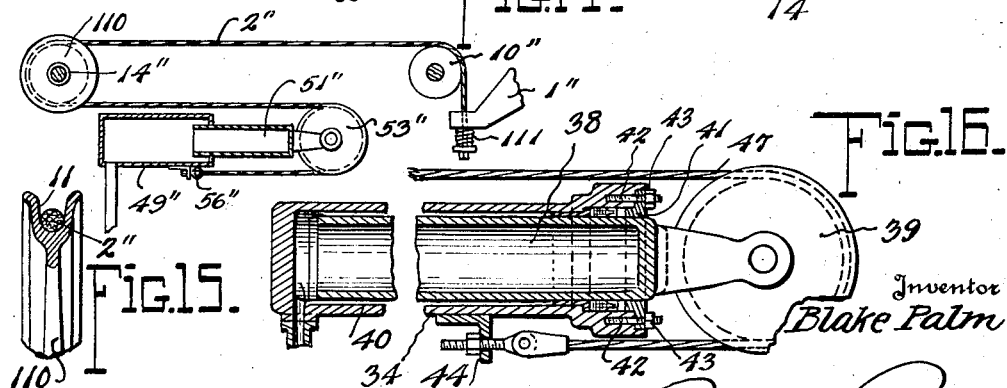

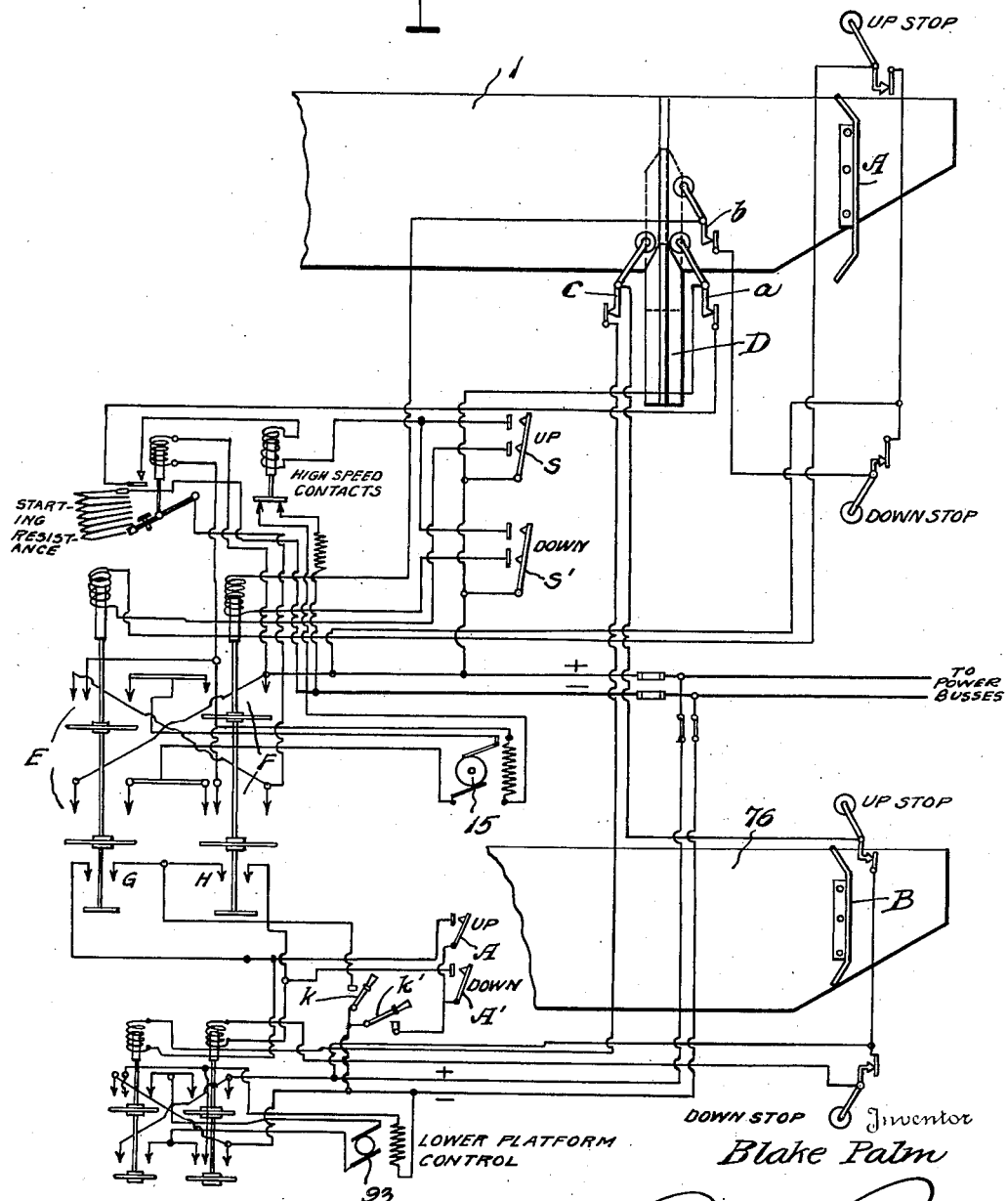

Patented Feb. 1, 1938

2,107,210

UNITED STATES PATENT OFFICE 2,107,210

ELEVATOR CONSTRUCTION

Blake Palm, Washington, D. C.

Application May 18, 1932, Serial No. 612,084

27 Claims. (Cl. 187—17)

My invention relates to elevator constructions and more particularly to those elevators having very large and heavy platforms or cars, one of the primary objects residing in the elimination of the objectionable common counterbalancing means consisting of weights or similar devices which must equal the weight of the operating platform or car, and in some instances including approximately 40% of the weight of the load to be handled.

Obviously, where the total weight of the elevator apparatus is an important factor, the elimination of the counterbalancing weights effects a very great reduction in the total weight of the apparatus. This is of considerable importance in the adaptation of any elevator system to ships such as airplane carriers, where the weight of each elevator platform for instance, amounts to substantially 100,000 pounds.

These airplane carriers usually employ a number of very large elevator platforms, measuring approximately 45 by 50 feet and being constructed of sufficient strength to withstand the landing impacts of the largest bombing planes as well as to convey the planes with efficient despatch to and from the flight deck and the storage or main deck below. To attain such strength, the platforms are necessarily very heavy, weighing upwards of 80,000 pounds. The usual live load to be handled by any one of these elevators does not generally exceed 20,000 pounds, substantially half of which must be counterbalanced in some manner or equalized, thereby requiring for a total counterbalancing weight about 90,000 pounds for each elevator. When the total weight of the elevator equipment is considered, as many as five elevator units being frequently employed, this dead load may run as high as 450,000 pounds or about 225 tons.

Since the weight or gross tonnage of these carriers and ships of war are necessarily held within certain limits by naval requirements, it therefore becomes of prime importance to eliminate all excess and unnecessary weight. This excess or unnecessary weight may be replaced by equipment such as ordnance, armament or otherwise put to a useful purpose, while at the same time holding the gross tonnage within the required limits.

In ordinary marine use such as ships other than ships of war, the elimination of unnecessary weight permits larger loads to be carried when provided with a system such as is embodied in this application than would be possible were elevator constructions of the usual type employed.

While my apparatus is primarily designed or adapted for use with airplane carriers, ships and the like, in which the weight reduction above referred to is important, I do not wish to limit my invention entirely to such use since my system may be employed in any installation wherein a reduction of weight of the entire apparatus is desirable or where the ordinary weight counterbalancing method for the platform is impracticable. As an example of an additional adaptation of my invention to practical use, it might be employed in ship lift locks as used in canal constructions wherein the ship moves into the lock and is bodily elevated and lowered by means other than the water alone.

As will be readily apparent, the same advantages of my system are obtained by the use of the system in stationary or land installations as distinguished from marine use.

My invention therefore contemplates the elimination of the usual counterbalancing weights commonly employed in elevator constructions for balancing the weight of the car or elevator platform by providing a balancing means for the car or elevator platform consisting of a pressure fluid system including cylinders and piston members having an operative connection with the car or platform to move therewith as the same is raised or lowered, the pressure in the system being maintained to a degree sufficient to cause the pistons to balance the weight of the car or platform and a material portion of the load carried thereby.

In the adaptation of my invention to marine use, it is an object to reduce the weight imposed on the vessel above the water-line whereby the stability of the ship or vessel will be correspondingly increased, such reduction being accomplished by the use of my pressure counterbalancing system for the elevator platform.

A further object in a marine installation is the elimination of the necessity of piercing the lower decks of the ship, such piercing being very objectionable in that it prevents isolation of certain sections of the ship should the lower compartments become flooded. Such elimination is accomplished by horizontally disposing the fluid pressure cylinders and pistons forming a part of the counterbalancing system, the cylinders being suitably fixed to the decks or other adjacent structure so as not to materially project into the space between decks.

Another object of the invention is the provision of an elevator system which dispenses with the usual counterbalancing weights commonly employed, and contemplates an elevator in which the load supporting member or platform is supported by a compressible fluid pressure medium contained in a closed system and including a plurality of pressure cylinders and pistons operatively connected with the load supporting member to effect a balancing relation between the pressure in the system operating on the pistons and the weight of the load supporting member. Such an arrangement is distinguished from the hydraulic or other pressure elevator systems known up to the present time, in that in these known types counterbalancing weights are employed in the same manner as in the well known cable lift types.

A further object of the invention is the provision of a pneumatic pressure fluid elevator balancing system wherein the elimination of the inertia present in the usual types of elevator systems now in use, incident to movement of the counterbalancing weights or the movement of the liquid in the hydraulic types, is practicably and efficiently accomplished, which in turn, results in a reduction in the amount of energy required for the operation of the elevator.

A still further object of the invention is the provision of a load supporting platform or car arranged to be supported by fluid pressure and including a pressure system for maintaining a substantially constant pressure to cause the load supporting member and a portion of the load to be supported by such pressure, the balance of the load being carried by operating mechanism in which it is further contemplated to render the effective pressure ineffective to support the load so as to allow the platform or load supporting member to descend by gravity.

Another object of the invention is the provision of an elevator platform arranged to be supported by fluid pressure acting on pistons operatively connected to the platform and movable in cylinders with which a pressure system is in communication, the pressure system maintaining a substantially constant pressure within the cylinders to cause the platform and a portion of the load to be supported thereby, the balance of the load being carried by operating mechanism in which it is further contemplated to render certain of the supporting pistons ineffective to support their portion of the load and thus cause a reduction in the total sustaining power of the pressure system so as to allow the platform to descend by gravity.

The invention further contemplates the provision of an elevator system for airplane carriers and the like wherein the elevator car or platform is supported on a plurality of pistons operating in pneumatic cylinders having communication with a closed pressure system in which the piston members constitute reservoirs for a portion of the pressure fluid contained within the system, the pressure fluid being maintained at a substantially constant pressure and to a degree sufficient to balance the platform and a portion of the load, and power means for moving certain of the pistons inwardly against the pressure in the system in such a manner that the total sustaining effect of the pressure is reduced to effect lowering of the platform, the power means also effecting a positive raising of the platform.

It is within the purview of the invention to provide an elevator system in which fluid pressure cylinders are employed, the cylinders having hollow plunger or piston members positioned within the same, and the cylinders and pistons being arranged to support a portion of the weight of the platform, and cable elevating means associated with the cylinders and pistons for raising the platform, including a power driven winding drum, certain of the plungers being connected with said drum so as to tend to rotate the drum and wind up the cable for the platform, the cylinders having communication with a closed pressure system in which the pressure is maintained at a degree sufficient to cause the plungers to support the car or platform, power means being provided for rotating the drum against the action of the pressure operating against the plungers tending to wind up the drum to permit lowering of the platform.

Another object of my invention is the provision of a mechanical pressure compensator for varying the effective pressure of the platform on the plungers to compensate for the slight change in pressure in the system due to the compression and expansion of the pressure fluid when the pistons or plungers move inwardly and outwardly as the platform or elevator car moves up and down.

A still further object is the provision of a second platform section or pit closure member arranged below the main elevator platform or car, this second platform or closure member being movable vertically into alignment with certain of the lower decks or floors when the elevator platform proper is moved away from the floor or deck.

It is also a further object to provide means for interconnecting the operating means for the elevator platform and the pit closure member above referred to to cause simultaneous movement of these elements.

Other and further objects and advantages of the invention will be hereinafter set forth and the novel features thereof defined by the appended claims.

In the drawings:

Fig. 1 is a vertical, longitudinal, fragmentary, sectional view showing a portion of an airplane carrier, having my improved elevator system installed therein;

Fig. 2 is a fragmentary cross-sectional view taken at right angles to Fig. 1, approximately on line 2—2 of Fig. 1;

Fig. 3 is a fragmentary plan view on a reduced scale and disclosing the arrangement of the elevator platform or load-supporting member and its main pressure cylinders.

Fig. 4 is an enlarged fragmentary, detail sectional view of the vertical guides and platform lift cables;

Fig. 5 is a plan view looking into the elevator pit and disclosing diagrammatically the arrangement of the platform lift winding drums, cables, and the lift jacks for the pit closure member;

Fig. 6 is a fragmentary, vertical sectional view showing the elevator platform in lowered position and disclosing the pit closure member in lowered position, with the supporting plungers for the latter;

Fig. 7 is a fragmentary detail view of one of the platform lifting cable shives and a portion of the platform to which the cable is anchored;

Fig. 10 is a fragmentary detail view of one of the cable drums, showing the cable reeving arrangement;

Fig. 11 is a diagrammatic perspective view of a slightly modified form of my invention;

Figs. 12 and 13 are side and end views respectively, of one form of pressure compensator;

Fig. 14 is a detail view of a modified arrangement of a power controlled piston or plunger associated with the platform of the elevator system;

Fig. 15 is a fragmentary detail view of a cable drum adapted primarily for use with the arrangement shown in Fig. 14;

Fig. 16 is an enlarged fragmentary sectional view of one of the pressure cylinders showing the hollow piston or plunger and the packing arrangement; and Fig. 17 is a diagrammatic showing of one control arrangement for simultaneously or independently controlling the operation of the main elevator platform or car and the pit closure member.

Figure 8:
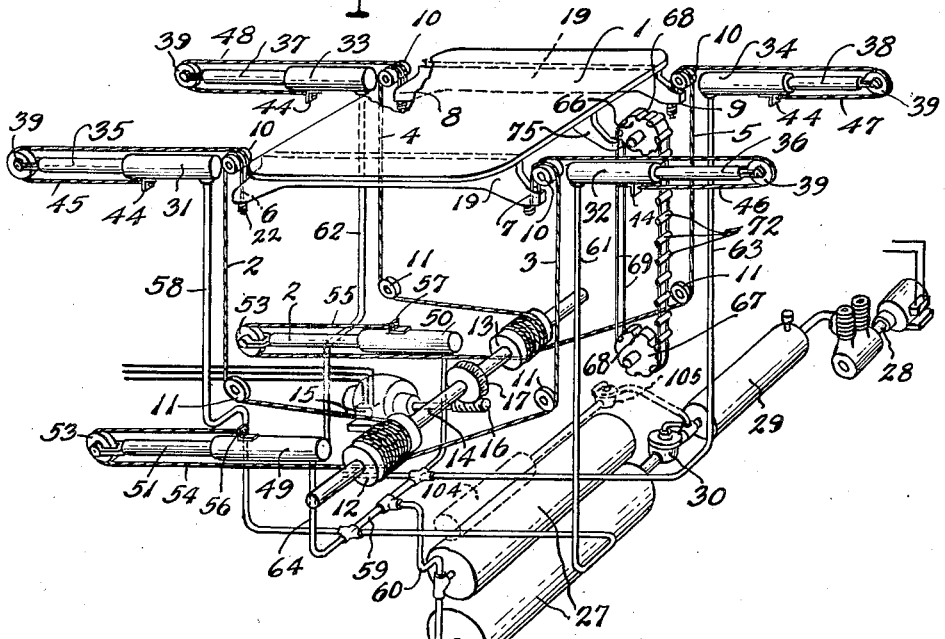
Fig. 8 is a diagrammatic perspective view showing the general arrangement of one form of my invention.

Like reference characters designate corresponding parts in the several figures of the drawings, wherein (referring first to the diagrammatic showing of the arrangement of Fig. 8), 1 denotes a vertically movable elevator platform or load supporting member to which are connected preferably at the corners thereof, cables 2, 3, 4 and 5, one end of the cables being anchored to the load supporting member 1 as at 6, 7, 8 and 9, the cables passing over shives 10 and 11 and having their opposite ends connected to winding drums 12 and 13 fixed to an operating shaft 14 in driving relation with a suitable power source 15, such as an electric motor, steam turbine, internal combustion engine or the like, through worm 16 and gear 17. The cables 2, 3, 4 and 5 are provided at their platform anchored ends with a link 18 fixed thereto and extending through the ends of the girders or cross beams fixed to the underside and forming a part of the load supporting member or elevator platform 1. These girders or cross beams are denoted 19 and are shown projecting laterally beyond the edges of the load supporting member to permit the cables and links 18 to be connected thereto. The links 18 are provided with suitable means such as nuts 20 or the like for preventing withdrawal of the links from the girders 19. Intermediate the nuts 20 and the lower face 21 of the girders are preferably positioned springs 22 or other suitable resilient members encircling the links 18 to provide a yieldable or shock absorbing connection between the links and the load supporting member. Suitable spring retaining cups or washers 23 and 24 may also be provided to receive the ends of the springs 22 to afford suitable engaging surfaces for the ends of the springs. It will thus be understood that the load supporting member 1 or platform is yieldably connected with the cables 2, 3, 4 and 5 through the links and springs above described. This yieldable or resilient connection, in addition to having a shock absorbing function, also has a safety function in that the relative movement between the links and the platform incident to expansion of the spring should one of the cables break, may be utilized to actuate safety mechanism which is well known in the art but has not been shown, to prevent the platform from falling.

The load supporting member or platform 1 is preferably guided in its vertical movements by fixed tracks 25 having engagement with guide shoes 26 preferably carried by the ends of the girders or cross beams 19 (see Figs. 4 and 6).

In winding the cables 2, 3, 4 and 5 on drums 12 and 13, it will be observed that cables 2 and 4 at one side of the load supporting member or platform 1 are carried over the top of the drums, whereas cables 3 and 5 at the opposite side of the load supporting member are carried beneath the drums, cables 2 and 3 being wound on drum 12 and cables 4 and 5 on drum 13 in the same direction so as to pay out or haul in all of the cables simultaneously and uniformly by rotation of the drums from the power source 15.

The counterbalancing arrangement for the load supporting member or platform 1 will now be described, and as shown diagrammatically in Fig. 8, it includes a pressure system having a reservoir 27 to which is connected a power driven compressor denoted generally by the reference character 28. This compressor may be connected to the reservoir 27 through a supplemental reservoir 29 with a suitable pressure regulator 30 intermediate the latter and main reservoir 27. Associated with the load supporting member 1 are a plurality of pressure cylinders 31, 32, 33 and 34, preferably disposed in a horizontal position and fixed to the stationary structure in which the apparatus is installed, such stationary structure being the deck of the ship or floor of a building. These cylinders will be hereinafter referred to as the platform or car cylinders as distinguished from the drum cylinders which will be hereinafter described.

Associated with these platform or car cylinders are pistons or plungers 35, 36, 37 and 38, said pistons being longitudinally movable within the cylinders and having at their outer or free ends cable shives 39 rotatably mounted thereon. As best shown in Fig. 16 the cylinders are provided with a liner 40 of suitable material to reduce friction and wear, the outer end of the cylinders being sealed or packed in the usual or standard manner with respect to the piston. For example, as shown in Fig. 16, the sealing or packing may be effected by means of a gland 41 bolted to the cylinder by means of bolts 42 and nuts 43 to compress a suitable packing material such as braided hemp or the like between the gland 41 and the outer extremity of the liner 40, the packing material being thus maintained in close or compressed relation with respect to the end of the cylinder and the outer surface of the piston to prevent leakage of the pressure fluid about the piston. If desired, the pistons may be positively guided in their longitudinal movements into and out of the cylinders, as will be readily apparent to anyone skilled in the art. The pistons are preferably hollow to form auxiliary or supplemental reservoirs for a portion of the pressure fluid in the pressure system.

Fixedly secured to the cylinders as by brackets 44, or to any stationary point relatively immovable with respect to the cylinders, are cables 45, 46, 47 and 48 adapted to extend over the shives 39 carried by the pistons or plungers 35, 36, 37 and 38 and over shives 10, the opposite ends of the cables being connected to the load supporting member or platform 1, as for example by being fixed in any suitable manner to the girders or cross beams 19.

Passing now to cylinders 49 and 50 which will be hereinafter designated the drum cylinders, said drum cylinders are carried by the surrounding structure in a manner similar to the platform or car cylinders and being constructed similar to the same. Associated with the drum cylinders are pistons or plungers 51 and 52, similar in construction to pistons 35, 36, 37 and 38, these drum cylinder pistons or drum pistons carrying shives 53 over which are trained or reeved cables 54 and 55 having one end suitably fixed, as for example by being anchored to brackets 56 and 57, fixed to the cylinders, the opposite ends of the cables being wound on drums 12 and 13 in a direction opposite to the winding of cables 2, 3, 4 and 5 on the drums. In other words, cable 54 is adapted to be wound and unwound by drum 12 and cables 55 by drum 13 so that when the power source is actuated in such a direction as to cause cables 2, 3, 4 and 5 to be paid off of drums 12 and 13 and lower the car or platform, cables 54 and 55 will be wound onto drums 12 and 13 respectively and vice versa. It is to be understood, of course, that the prime mover or power source 15 is reversible or is associated with suitable reversing mechanism not shown, for rotating drums 12 and 13 in opposite directions.

The drum cylinders 49 and 50 and the platform cylinders 31, 32, 33 and 34 are all connected to the pressure system reservoir 27 by suitable conduits. For example, conduit 58 establishes communication between cylinder 31 and a header or common connecting conduit 59 suitably connected to reservoir 27 by conduit 60. Likewise conduits 61, 62, 63, 64 and 65 establish communication between cylinders 32, 33, 34, 49 and 50 respectively and the reservoir 27 through the header 59 and conduit 60. Thus there is formed a closed pressure system having communication with all of the cylinders for maintaining pressure on the pistons associated therewith to establish an equalizing or counterbalancing pressure as will now be described. The size of the cylinders and pistons, and the pressure of the pressure fluid in the system is such that the platform cylinders 31, 32, 33 and 34 and associated mechanism are insufficient to support or counterbalance the entire weight of the car or platform 1, these cylinders being preferably designed or constructed to counterbalance approximately two-thirds of the platform or car weight. Cylinders 49 and 50, together with their respective pistons or plungers 51 and 52 are preferably designed to support or counterbalance the remaining weight of the platform or car 1 and in addition substantially 40% of the maximum load for which the elevator construction is designed to accommodate.

As shown in Fig. 8, with the elevator with the load supporting member or platform 1 in its raised or uppermost position, actuation of the power source 15 to cause rotation of shaft 14 in a counterclockwise direction will pay off cables 2, 3, 4 and 5 from the drums 12 and 13, to lower the platform against the sustaining or equalizing pressure of the pressure system acting upon the platform through the various cylinders, pistons and cables forming the counterbalancing arrangement. Since cables 54 and 55 of the drum cylinders and pistons are arranged on drums 12 and 13 so as to be wound thereon during the paying off of cables 2, 3, 4 and 5, as above mentioned, drum pistons 51 and 52 will be positively drawn inwardly of their cylinders, which, in effect, negatives the sustaining action of these cylinders and pistons with respect to the car or platform 1. Since, as hereinbefore mentioned, the sustaining effect of the platform or car cylinders and pistons is not sufficient to counterbalance or support the weight of the car or platform, the platform or car will descend by gravity until the actuating movements of the power source 15 are interrupted. To effect elevation of the platform or car, it is merely necessary to rotate the shaft 14 and drums 12 and 13 in the opposite direction from that just described to effect lowering, and cables 2, 3, 4 and 5 will be wound on drums 12 and 13 while cables 54 and 55 will be paid off of drums 12 and 13, the paying off of cables 54 and 55, tending to assist the rotation of drums 12 and 13 by virtue of the pressure exerted thereon through pistons 51 and 52 normally being forced in an outward direction with respect to their cylinders by the pressure in the pressure system. The pressure acting on the platform pistons is transmitted through the cables associated therewith and connected to the platform so as to assist in elevating the same.

During elevation and lowering of the car or platform, the outward and inward movements of the pistons will cause a slight variation in the pressure in the pressure system, although this variation is so slight that the pressure may be termed a substantially constant pressure. This variation is due to the compression of the pressure fluid and expansion of the same by the movements of the plungers or pistons in their inward and outward movements. For the purposes described herein, a minimum pressure in the system of approximately 575 pounds per sq. in. is satisfactory, this minimum pressure being attained when the car or platform is in its most elevated position with all of the pistons in their outward or extended positions. With such a minimum pressure in an elevator system such as is shown in Fig. 8 and as adapted for airplane carriers, a platform or car piston diameter of 8¼" and a drum piston diameter of 7½" is satisfactory. Under these conditions, the pressure in lowering the car or platform a distance normally required for such an installation would increase to approximately 625 lbs. per sq. in. in the extreme position.

It is to be understood that I do not wish to be limited to the dimensions or pressures above referred to since they may be changed to suit the particular installation and may be readily computed by anyone skilled in the design of elevator constructions.

While I have shown in certain of the figures single cables associated with the drums and pistons, I do not wish to be limited to such an arrangement since the construction may be readily modified to permit the utilization of a plurality of cables as would preferably be employed in actual practice, the single cables being shown for the sake of clearness and in order to more readily explain the principles of the invention. Also, the reeving of the cables may be such that the linear movement of the pistons may be considerably reduced in a given vertical movement of the car or platform, this being readily accomplished by employing multiple shives such as are well known in the art.

To compensate for the variation in pressure in the pressure system hereinbefore referred to, it may be desirable to employ a mechanical compensator to offset this variation. Such a compensator is shown best in Figs. 12 and 13, although I do not wish to be limited to the exact construction which will now be described. In the exemplary form of compensator disclosed in the drawings, it comprises a pair of vertically spaced pulleys, shives, or sprockets 66 and 67 having notches or grooves 68 about the periphery thereof, and a preferably endless flexible member 69 in the form of a band, web, or spaced cables 70 and 71 to which are suitably connected at spaced intervals weight members 72 extending laterally across the flexible member 69, these weight members being so arranged that they will seat in the notches or grooves 68 as the flexible member is shifted about the shives or pulleys 66 and 67. A suitable guide member 73 cooperating with the weight members prevents vibration or surging of the weight members during their movements. In the form of the system shown in Fig. 8, the flexible member 69 is suitably fixed to the car or platform as at 74 by means of a bracket 75 or the like, carried by the platform. In such an arrangement the weight members on the flexible member are applied to the latter at intervals for approximately one-half of the total length of the flexible member and the connection between the car or platform with the flexible member is made at such a point on the flexible member that when the car or platform is in its most elevated position the weight members are disposed to one side of a vertical plane through the shives or pulleys opposite to the side to which the platform or car is connected, in which position the weights tend to lighten the effective weight of the car or platform. As the car or platform moves downwardly, it has been explained that the pressure in the pressure system increases slightly and the flexible member is shifted about the shives to transpose the weights to the side of the vertical plane extending through the shives, towards the platform or car, thereby in effect increasing the effective weight of the car or platform in proportion to the increase in pressure. Thus the compensator just described acts as a means for varying the effective weight of the car or platform to compensate for the variation of the pressure in the pressure system incident to movement of the car or platform and corresponding movement of the pistons associated therewith.

While the compensator has been shown in Figs. 8 and 12 as being directly actuated by the car or platform, its use is not so limited since it may also be effectively employed to act in the same manner by suitably connecting one of the shives or pulleys 66 and 67 to drive shaft 14 of Fig. 8. In this arrangement, the grooves in the shives, cooperating with the weight member positively cause the flexible member to be shifted incident to rotation of the shive by the drive shaft as distinguished from the positive actuation of the flexible member by directly connecting the same to the car or platform.

Figure 9:
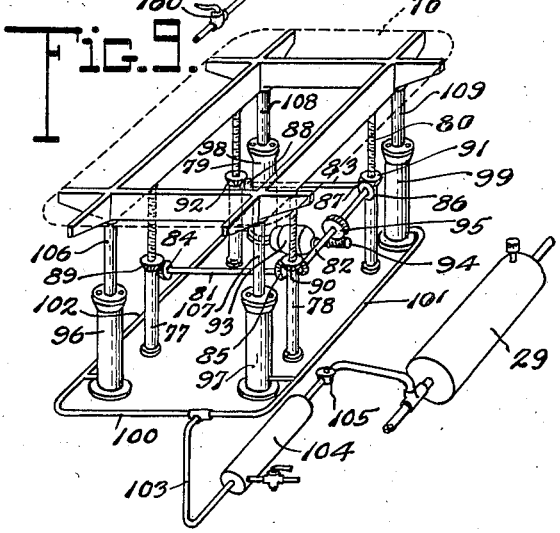
Fig. 9 is a diagrammatic perspective view of the lower movable section or pit closure member.

Referring now to the pit closure mechanism shown best in Figs. 1, 2, 6 and 9, and particularly Fig. 9, this may be of any desired type, preferably including a platform 76 having screw jacks 77, 78, 79 and 80, or the like, suitably fixed below the same for effecting elevation and lowering of the platform 76. These screw jacks may be of any desired type and are geared together by suitable shafts 81, 82 and 83 carrying bevel gears 84, 85, 86, 87 and 88 meshing with bevel gears 89, 90, 91 and 92 associated with jacks 77, 78, 79 and 80 whereby the jacks may be operated simultaneously from a power source 93 such as an electric motor, steam turbine, or other prime mover connected to the shafts as for example through worm 94 and the gear 95. The prime mover is preferably of a reversible type or suitable reversing mechanism may be interposed between the same and the drive shafts for permitting reversal of the drive to enable the jacks to be elevated or lowered.

Associated with the platform 76 in supporting relation thereto, are suitable pressure devices for counterbalancing the weight of the platform, such pressure devices being preferably in the form of cylinders 96, 97, 98 and 99 interconnected by conduits 100, 101, 102 and 103 to an auxiliary reservoir 104, which may be also connected to the compressor 28 hereinbefore described, a pressure regulator 105 being preferably interposed between the compressor 28 and the reservoir 104. Pistons or plungers 106, 107, 108 and 109 operate respectively in cylinders 96, 97, 98 and 99, said pistons being suitably fixed to the lower side of the platform 76 so as to effect a counterbalancing of the platform by the pressure in the system. The pressure in the system is preferably such that the platform 76 would normally be supported in a mean position of its vertical movement, when disregarding the screw jacks, and thus when the screw jacks are operated by their power source to lower the platform 76 in the lower half of its vertical movement, the pressure in the system will be slightly increased by the compression of the pressure fluid by the pistons as they are forced inwardly of the cylinders, it being understood that the pressure system is a closed system. Likewise, in elevating the platform 76 in the upper half of its vertical movement, the pressure in the system will be slightly decreased incident to the expansion of the pressure fluid as the pistons are extended from the cylinders.

The platform 76 is designed to conform with the shape of the pit opening or hatchway and is normally of the same size as the main car or elevating platform 1 hereinbefore described, the platform 76 being so arranged as to be moved into alignment with the lower deck or floor with which the elevator construction is associated as the car or platform 1 is elevated to a higher floor or deck. Then, as the car or elevator platform 1 is lowered, the platform 76 is also lowered to permit alignment of the car or platform 1 with the lower floor or deck. The vertical movement of the platform 76 is preferably very slight as compared with the movement of the car or elevator platform 1, the distance being only enough to permit the alignment of the main car or elevator with the lower level without coming into contact with the pit closure platform. If desired, the car or platform 1 and the pit closure platform 76 may be controlled entirely independently of each other, but it is preferable to arrange the control systems for automatic simultaneous operation. An electrically interconnected arrangement for such simultaneous operation is diagrammatically shown in Fig. 17 and will now be described.

Carried by the main platform and the auxiliary platform or pit closure 76 are cam members A and B cooperating with upstop and downstop switches for automatically limiting the upward and lowering movements of the platforms, these cam members and limit switches being well known in the art. Thus, cam A is for the purpose of actuating electric switches whereby the circuit to the motor 15 for the main platform 1 is interrupted automatically at the upper and lower terminal landings. Similarly, cam B on the lower or auxiliary platform actuates switches in the same manner for automatically stopping the auxiliary platform at its upper and lower limits of travel. Also carried by the main platform 1 is a cam member D, preferably slidably mounted beneath the platform so as to normally project below the same, the cam being slidable in suitable guides positioned on the platform. Cooperating with this cam member D are limit switches $a$, $b$ and $c$ to be actuated by cam member D for the purpose of slowing down and stopping the main platform in the event it approaches too close to the lower or auxiliary platform, or accidentally actually contacts or collides with the same. Limit switch $a$ is connected in series with a slow down solenoid on the main elevator switchboard (not shown), thereby releasing the solenoid coil and contact members associated therewith to open the circuit when the limit switch is actuated by the cam D and cut out the resistance of the field circuit of the motor or otherwise suitably cause the motor to operate at slow speed, cam member D having been moved upwardly by contact with the lower or auxiliary platform as the main elevator platform approaches close to the lower platform and thereby actuating this limit switch $a$. If the cam D is moved further upwardly by engagement with the lower or auxiliary platform, limit switch $b$ is actuated to open the downstop circuit and completely interrupt the circuit to the motor 15 causing the main platform to stop before it collides with the lower or auxiliary platform. The main platform is thereby rendered inoperative for further downward movement, but is free to move upwardly away from the lower platform as will be apparent from the circuit shown in Fig. 17. As soon as the upper platform moves up, the limit switches are closed automatically to recondition the circuit for normal actuation of the main platform in either direction. An additional limit switch $c$ is provided in series with the main control circuit for the lower platform motor 93 to cause interruption of the circuit to prevent further upward movement of the lower platform towards the upper platform in the event the lower platform is being raised too fast or the upper platform not fast enough, this limit switch being also actuated by cam D as it is moved upwardly when the platforms approach each other.

The actuation of cam D and limit switches $a$, $b$ and $c$ is entirely independent of the push button or circuit controls S and S' for the upper or main platform and $s$ and $s'$ for the lower auxiliary platform or pit closure, these push button or control switches being suitably carried by the main elevator or so located at a stationary control point to permit operation of the elevators from the platforms or some stationary point as desired. Push button switch or control S controls the upward or elevating movement of the main platform 1 and simultaneous elevation of the pit closure or auxiliary platform 76, while push button switch or control S' controls the simultaneous lowering movements of the platforms. Switch $s$ controls the upward movement of the pit closure or auxiliary platform independently of the main platform when cut-out switch $k$ is opened, and likewise switch $s'$ controls the independent lowering movement of the pit closure or auxiliary platform. By opening an additional cut-out switch $k'$, the control circuit for the lower or auxiliary platform is rendered completely inoperative.

With cut-out swiches $k$ and $k'$ in closed position, the actuation of the up switch S causes the main platform or car and the lower platform or pit closure to operate simultaneously, automatically, and in synchronism in an upward direction. The solenoid operated direction contacts E and F of the main platform or elevator control circuit automatically close contacts G and H, thereby closing the motor operating circuit for the auxiliary platform or pit closure to cause it to move always in the same direction as the main platform is moving. Down switch S' controls the automatic simultaneous lowering of the platforms.

As above mentioned, to control the movements of the pit closure independently, it is merely necessary to open cut-out switch $k$ and actuate switch $s$ for upward movement and $s'$ for downward movement. Opening both cut-out switches $k$ and $k'$ renders the entire control circuit for the pit closure inoperative as may be desirable under certain conditions which will be hereinafter mentioned.

In place of the safety cam D shown in Fig. 17, any suitable mechanism might be employed, as for example a pair of screw shafts operated by the drive shafts for the main and auxiliary platform operating mechanism, these screw shafts carrying threaded traveling dogs adapted to co-operate with knock-out switches arranged in the circuits in a similar manner to limit switches $a$, $b$ and $c$, the operation of the knock-out switches being dependent upon the relative positions of the dogs on the screw shafts. The details of such an arrangement will be readily apparent to anyone skilled in the art.

It will be obvious from the foregoing that the object of the arrangement diagrammatically shown in Fig. 17 is to provide an electrically interlocked control system for the main elevator and pit closure under all normal conditions, and proper control of the elevators when traveling at their highest practical speeds. While a single slow-down switch $a$ has been shown, additional slow-down switches may be provided. Also the circuit may be modified slightly to incorporate additional switches for effecting automatic leveling of the main platform at its terminal landings, such automatic leveling being well known in the art. I therefore, wish it to be understood that I do not wish to be limited to the specific control circuit shown, Fig 17 being merely for the purpose of illustrating the broad idea of the interconnecting arrangement and controls for accomplishing the results desired.

While I have shown screw jacks for effecting vertical movements of the pit closure platform 76, it is to be understood that I do not wish to be limited to the same since any suitable elevating and lowering means may be employed without departing from the principle of the invention. Screw jacks, however, are perhaps one of the simplest means for effecting the operation of the pit closure member.

In the modified form of the invention diagrammatically illustrated in Fig. 11, the car 1' or platform, as it may be, is shown suspended by a cable 2' wound on a drum 12' fixed to the drive shaft 14', the drive shaft being suitably geared to a power source 15' such as an electric motor or the like as hereinbefore mentioned, through gear 17' fixed to shaft 14' and worm 16' fixed to the motor shaft. Also connected to the car 1' is a cable 45' reeved over a shive 39' rotatably carried by the free or outer extremity of a piston 35' slidably movable in a pressure cylinder 31', the cable being dead-ended or fixed to the cylinder as at 44' or other relatively fixed point. Cables 2' and 45' pass over suitable shives 10' to suspend the car or platform 1' for vertical movement.

Also fixed to drive shaft 14' is a drum 13' on which is wound a cable 54' adapted to pass over a shive 53' rotatably carried by the outer or free extremity of a piston 51' slidable in pressure cylinder 49', the end of the cable being fixed or dead-ended as at 56'. Pressure cylinders 31' and 49' are in communication with a reservoir 27' through conduits 58', 64' and 59' through which the pressure of the system is imparted to the pistons 35' and 51'. The reservoir 27' is connected to a supplemental reservoir 29' with a pressure regulator 30' in between, the supplemental reservoir 29' being connected to a suitable compressor (not shown in Fig. 11), as shown in Fig. 8.

In this construction, it will be seen that in actuating the drive shaft 14' by the power source 15' in such a direction as to pay off cable 2' from drum 12', drum 13' will wind up cable 54' and positively draw piston 51' into its cylinder 49' as shown in the dotted lines in Fig. 11. As in the form of the invention hereinbefore described, the effective equalizing force exerted by piston 35' is substantially equal to two-thirds of the weight of the car 1', the balance of the weight of the car and substantially 40% of the maximum load to be carried thereby being counterbalanced by the pressure of the system acting upon piston 51'. Thus, as cable 54' is wound on drum 13', the counterbalancing effect of the pressure in the system acting on piston 51' is opposed or negatived, and since the force on piston 35' is insufficient to counterbalance the weight of the car or the load on the same, the car will descend by gravity as cable 2' is paid off. This lowering movement of the car also effects an inward movement of piston 35' into its cylinder 31', the inward movements of pistons 35' and 51' causing a slight increase of pressure in the pressure system due to the compression of the pressure fluid by the pistons, the system being a closed system. This variation in pressure is indicated by the arrows in Fig. 11 representing the upper and lower limits of vertical movement of the car and a median position.

To compensate for this variation in pressure in the system during the movements of the car, a compensator such as has been hereinbefore described and particularly shown in Figs. 12 and 13, may be employed to vary the effective weight of the car. The compensator may be directly connected to and controlled by the car as was shown in Fig. 8, but if desired, it may be directly connected to the drive shaft 14' as shown in Fig. 11. As illustrated in Fig. 11 shive or sprocket 66 is fixed on shaft 14' so as to be rotatable thereby, shive 67 being suitably positioned for rotation in vertically spaced relation to shive 66. The endless flexible member 69, such as spaced cables 70 and 71, operate in grooves formed in the shives and carry weight members 72 at spaced intervals corresponding with the spacing of the grooves 68 formed about the periphery of the shives. These weight members are arranged on substantially half the length of the flexible member so as to be disposed on that side of a vertical plane passing through the axes of the shives, opposite to the side on which the elevator is disposed, when the elevator is at its upper limit of travel, in which position the pressure in the system is at a minimum. As the car moves downwardly, the flexible member is shifted or rotated by the shives 66 and 67 so as to transpose the weight members carried thereby to the other side of the vertical plane above referred to in proportion to the increase in pressure in the pressure system. The transposition of these weights has the effect of adding to or detracting from the effective torque on the drive shaft 14 imparted to the same by the weight of the car and/or the load carried thereby thus varying the effective weight of the car.

While I have shown in Fig. 11 single cylinders and cables, it is to be understood that I do not wish to be limited to such an arrangement, since as hereinbefore explained with relation to the form of the invention previously described, the number of cylinders, the size of the same, the number of cables associated with each cylinder, and the pressure in the system may be varied to suit the conditions of each particular installation. By the use of multiple shives, the length of movement of the pistons may be reduced without departing from the principles forming the embodiment of the invention.

In Fig. 14 there has been shown a modified form of cable reeving which may be substituted for the drum type shown in Figs. 8, 10 and 11. In this modified form, instead of employing drums such as 12', 13', a shive 110 having a tapered or substantially V-shaped groove 111 about the periphery of the same, is fixed to the drive shaft 14'' for receiving a cable 2'' in the groove, one end of the cable being fixed to the car or platform in any suitable manner as at 111 and the other end of the cable being dead-ended or fixed to pressure cylinder 49'' as at 56''. The cable passes over suitable shive 10'' to extend about shive 110 in a half-turn and over shive 53'' carried by the outer end of piston 51'' operable in cylinder 49''. By virtue of the tapering of the groove in shive 110, the drive for the cable will be a suitably positive one to effect raising and lowering of the platform or car 1'' and inward and outward movement of piston 51''. Thus the arrangement of Fig. 14 may be substituted for those shown in Figs. 8 and 11, cylinder 49'' being used as a drum cylinder (49, 50 in Fig. 8 and 49' in Fig. 11). In the form shown in Fig. 8, two or more drum cylinders 49'' may be used in conjunction with two shives 110 in substituting the modified arrangement for drum cylinders 49 and 50 and drums 12 and 13. The car or platform cylinders and associated mechanism may remain the same.

From the foregoing, the operation of my improved elevator system should be apparent and will be briefly summarized as follows: For the sake of clarifying and emphasizing the operations, the summary will be made with reference to an airplane carrier installation embodying the principles of the invention as shown in Figs. 1 to 7, inclusive. In these figures, the form of the invention diagrammatically illustrated in Fig. 8 is employed. The airplane carrier or ship generally denoted as 150 is provided with a flight deck 151 to and from which the planes are transported from and to the main deck 152, below, the space between decks 151 and 152 constituting the storage or hangar space 153 for the planes. These deck levels comprise the upper and lower terminals of movement of the elevator platform or car 1. However, if desired, the movement of the platform may be extended to lower levels or decks, such as 154, 155 and 156. The decks are formed with openings 157 and 158 therein forming the elevator pit, hatchway, or well. Except when engaged in operation between decks, the platform 1 is generally kept in position in alignment with the flight deck, as shown in full lines in Figs. 1 and 2. Suitable sealing means such as flaps or gaskets arranged about the edges of the platform and/or pit may be provided to maintain the water-tight relationship of the decks and prevent water from running into the elevator pit and reaching the lower decks. This is very desirable when operating in rough or stormy weather. With the main or load supporting platform 1, in its upper position, it is desirable to provide means for closing the elevator pit at the lower or main deck where the planes are generally housed to enable trucking the planes or other apparatus from forward to aft or vice versa, or other shifting of the planes or apparatus about the deck. This is particularly desirable if platform 1 is to remain in its elevated position for any substantial length of time. For the purpose of closing the pit when the platform 1 is elevated as above described, an auxiliary platform 76 is employed and arranged to be aligned with the main or hangar deck 152 when in its elevated position as shown in full lines in Figs. 1 and 2. When it is desired to lower the platform 1 from the flight deck to the hangar deck to transport or convey a plane from the flight deck to the hangars or the hangar deck, the auxiliary platform is adapted to be preferably simultaneously lowered with the main platform to a position, shown by the dotted lines in Figs. 1 and 2, thereby permitting alignment of the main platform with the main or hangar deck 152. During flight operations, the main platform must be able to withstand landing impacts of the planes as well as having sufficient strength to withstand the static loads placed on the same during the transportation or conveying of the planes between decks. The auxiliary platform or pit closure must also be of sufficient strength to withstand loads placed on the same when planes or other apparatus are trundled or trucked about the main or hangar deck and in so doing pass over this auxiliary platform. In Fig. 1, the platform cylinders and pistons are shown disposed in a horizontal position to eliminate the necessity of piercing the lower decks, the cylinders being suitably fixed to the surrounding structure of the ship. Suitable guides or guards 159 may be provided about the cables where desired.

The operating mechanisms for the platforms have been shown and described as an electrical system, such power being readily available on the ships. Thus, to lower the platform or car 1 from the full lined position shown in Figs. 1 and 2, the control switch is actuated to set the motor for rotating the drive shaft into operation, the drum pistons being positively drawn inwardly of their cylinders to negative or oppose the counterbalancing effect of the same, at the same time paying off the main cables for the platform to permit the platform to be lowered by gravity, the platform pistons being incidently drawn inwardly of their cylinders by such lowering.

Simultaneously with the operation of the main platform or elevator, the motor drive for the auxiliary platform or pit closure is set into operation to actuate the screw jacks and withdraw the auxiliary platform against the sustaining or counterbalancing force of the auxiliary platform pressure cylinders and pistons. The lowered positions of both platforms are shown dotted in Figs. 1 and 2.

To effect an elevation of the platform, the motor is operated to reverse the direction of rotation of the drive shaft whereby the platform cables are wound upon the drums, the drum piston cables being paid off from the drums to permit such raising action. In the raising movement of the platform, the sustaining or counterbalancing pressure exerted on all of the pistons assists the power lift exerted from the power source through the main cables. As the main platform is being elevated, the power source for the auxiliary platform is set into operation to rotate the screw jacks and effect an elevation of the auxiliary platform or pit closure, bringing the pit closure into alignment with the main deck or hangar substantially at the same time the main platform reaches an aligned position with the flight deck. In the elevating movement of the auxiliary platform, the counterbalancing or equalizing pressure of the pressure system associated with this platform assists the elevating action of the power mechanism.

While the control mechanisms for the main and auxiliary platforms are preferably interconnected for simultaneous operation, it is desirable to provide means for independently actuating the platforms. For example, if the main platform is to be operated continuously for a substantial length of time without interruption, such as is the case when a number of planes are conveyed from the flight deck to the hangars or vice versa in rapid order, there is no real necessity for closing the pit at the main deck level each time the main platform is raised to the flight deck. To this end, control switches are provided for breaking the connections between the control systems for the separate operating mechanisms so that the auxiliary platform may be retained in a lowered position while the main platform is being elevated and lowered, thereby effecting a saving in powering and saving wear on the auxiliary platform apparatus. At any desired time, the interconnection between the systems may be restored for the purpose of effecting simultaneous operation as usual.

As a safety feature, suitable mechanism is employed to prevent collisions or impacts of one platform against the other such as might occur in the event the auxiliary platform for some reason was not lowering fast enough or became inoperative by reason of a circuit or structure failure. This mechanism has been specifically described above and will be clear without further repetition of the same.

It is also desirable to provide means for permitting raising or lowering of either or both the main and auxiliary platforms in the event the power source fails, such as by reason of a circuit failure or rupture. To accomplish this with respect to the main platform, bleed valves 160 shown in Fig. 8, and 160' shown in Fig. 11, are provided to permit reduction of the counterbalancing pressure in the pressure system to permit lowering of the platform to the proper or desired level. If a worm and gear drive between the motor and the drive shaft is employed, suitable means are preferably provided to free the motor and permit such lowering by bleeding the pressure cylinders or system. To raise the platform under similar power failure conditions to bring the platform to its proper or desired level, the pressure regulators 30 of Fig. 8 or 30' of Fig. 11, may be manipulated to permit the pressure in the system to be increased and thereby effect an elevation of the platform by such increased pressure, it being understood that the pressure in the supplemental reservoir 29 of Fig. 8 and 29' of Fig. 11 is considerably higher than the pressure in the main reservoirs 27 and 27' and associated systems. Here again it may be necessary to disconnect the motor or prime mover from the drive shaft as for example by a clutch or in any other suitable manner, depending upon the type of gearing used connecting the motor to the drive shaft.

To enable the auxiliary or pit closure platform to be elevated or lowered in the event of circuit failure, suitable means may be provided for accomplishing this manually. For example, in the mechanism shown in the drawings, particularly Fig. 9, a crank, capstan or the like may be provided to rotate the drive shaft for the screw jacks by hand. With the arrangement shown, it is necessary to disengage the worm drive to accomplish this manual operation of the screw jacks. It is to be understood, however, that I do not wish to be limited to a worm drive in the power lift mechanism for either the main or auxiliary platforms.

While the specific details of construction have been herein shown and described, the invention is not confined thereto, as changes and alterations may be made without departing from the spirit thereof as defined by the appended claims.

Having thus described my invention, what I claim as new and desire to secure by Letters Patent is:

1. In elevator construction, the combination with an elevating member, of balancing means for said member comprising a plurality of pressure fluid operated sustaining instrumentalities arranged to support the elevating member, means for maintaining a substantially constant pressure on said instrumentalities including a closed fluid pressure system, and separate power operated means for varying the degree of sustaining effect of certain of said instrumentalities to cause relative movement of the said elevating member.

2. In elevator construction, a support, an elevating member movable relative thereto, sustaining means for said elevating member comprising pressure fluid operated instrumentalities including a closed fluid pressure system and means for maintaining a substantially constant fluid pressure on said instrumentalities in excess of that necessary to balance the weight of said elevating member, and power operated means connected with said elevating member to cause elevation thereof, said power operated means being directly connected with said pressure fluid operated instrumentalities independently of the connection with said elevating member to reduce the elevating member sustaining effect thereof to cause lowering of said elevating member.

3. In elevator apparatus of the class described, the combination of a movable platform, pressure cylinders associated with said platform and having plungers operatively connected with the same, a closed pressure system communicating with said cylinders, means for maintaining the pressure within the system and on said plungers to support a portion of the weight of said platform, a cable drum, a cable on said drum connected with said platform to raise the platform upon rotation of the drum in one direction, additional pressure operated instrumentalities connected with said pressure system, means for connecting said instrumentalities with said cable drum, said means normally tending to rotate the drum to wind up the cable aforesaid, said instrumentalities constituting means for sustaining the balance of the weight of the platform and a portion of the load to be carried thereby, and power means for rotating said cable drum.

4. In elevator construction, a support, a cylinder carried by said support, a hollow plunger operating in said cylinder, a closed pressure system for supplying pressure to said cylinder, a platform operatively associated with the said cylinder and plunger and partially supported by the pressure in said system on said plunger, said platform being movable relative to said support, means for causing raising and lowering of said platform including a winding drum having a cable connected to the platform for lowering the platform upon rotation of the drum in one direction and for raising the platform upon rotation of the drum in the opposite direction, a pressure operated plunger connected with said drum, a pressure cylinder for said plunger connected with the pressure system, said plunger being actuated by the pressure in the system to normally tend to resist rotation of the drum in the first-mentioned direction to lower the platform, and means for rotating the drum in opposite directions.

5. In elevator apparatus of the class described, a load supporting platform, balancing means therefor comprising a closed fluid pressure system including a plurality of fluid pressure cylinders and fluid pressure operated plungers associated with said platform in weight sustaining relation thereto, means for maintaining a platform balancing pressure within said system and in said cylinders, and power means for reducing the sustaining effect of certain of said cylinders to effect a lowering of the platform.

6. In apparatus of the class described, an elevator platform, a winding drum, a cable adapted to be wound on and unwound from said drum, said cable being connected with said platform to effect raising and lowering of the platform, a pressure operated plunger member, a cylinder for said plunger member, a cable operatively connecting the said drum and said plunger member to be maintained under tension by said plunger to normally resist rotation of said drum in one direction, and to maintain a partial sustaining tension on said first-mentioned cable, a supplemental supporting pressure operated plunger member for said platform, a cylinder for the same, a supplemental sustaining cable connecting said last-mentioned plunger member and said platform, a closed pressure system communicating with the cylinders aforesaid, means for maintaining a platform balancing pressure in said system and on said plungers, and power means operating in conjunction with the first mentioned pressure operated plunger to rotate said drum in one direction for raising said platform and to rotate said drum in the opposite direction against the first mentioned pressure operated plunger to reduce the total effective platform sustaining effect of said first-mentioned plunger member whereby to cause lowering of said platform.

7. In an airplane carrier of the class described having a flight deck and a main or storage deck, said decks having openings therein forming an elevator pit or well extending through the said flight and main decks, an elevator platform movable into alignment with said decks, a pit closure platform movable into closed relation with respect to the well in the said main deck, pneumatic counter-balancing means for both of said platforms including a closed pressure system, pressure operated platform sustaining plungers operatively associated with said platforms and with said system, and power means for reducing the sustaining effect of said plungers to cause lowering of said platforms, said power means being also operative in conjunction with the pressure operated plungers for elevating said platforms.

8. In an airplane carrier of the class described having a flight deck, and a main or storage deck, said decks having openings therein forming an elevator pit or well extending through the said flight and main decks, an elevator platform movable into alignment with said decks, a pit closure platform movable into closed relation with respect to the well in the said main deck, pneumatic counter-balancing means for both of said platforms including a closed pressure system, pressure operated platform sustaining plungers operatively associated with said platforms and with said system, and power means connected to the plungers for overcoming the sustaining effect of said plungers to cause simultaneous lowering of said platforms, said power means being also operative for effecting simultaneous elevation of said platforms.

9. In apparatus of the class described, the combination of a load supporting member, pressure means connected therewith for counterbalancing a portion of the weight of said load supporting member, a drum, a cable on said drum connected to said load supporting member, additional pressure means associated with said drum for counterbalancing the remaining portion of the weight of the load supporting member and a portion of the load to be carried thereby, and means for reducing the sustaining effect of said last-mentioned pressure means by rotation of the said drum in one direction to cause lowering of the said load supporting member.

10. In apparatus of the class described, the combination of a load supporting member, pressure means connected therewith for counterbalancing a portion of the weight of said load supporting member, a drum, a cable on said drum connected to said load supporting member, additional pressure means associated with said drum for counterbalancing the remaining portion of the weight of the load supporting member and a portion of the load to be carried thereby, and means for reducing the sustaining effect of said last-mentioned pressure means by rotation of said drum in one direction to lower the said load supporting member, said reducing means being operable for imparting a positive lifting action to said load supporting member by rotation of the drum in the opposite direction for elevating the said load supporting member.

11. In apparatus of the class described, the combination of a load supporting member, fluid pressure operated sustaining means for counterbalancing the weight of said load supporting member and a portion of the load to be carried thereby, a closed fluid pressure system connected to said fluid pressure operated sustaining means, a drum, cables connecting said drum with said load supporting member and with said fluid pressure operated sustaining means, power means for operating said drum to effect raising and lowering of said load supporting member, and compensating means for maintaining the sustaining effect of said fluid pressure operated means on the load supporting member substantially constant in all positions of said load supporting member.

12. In apparatus of the class described, the combination of a load supporting member, fluid pressure operated sustaining means for counterbalancing the weight of said load supporting member and a portion of the load to be carried thereby, a closed fluid pressure system connected to said fluid pressure operated sustaining means, a drum, cables connecting said drum with said load supporting member and with said fluid pressure operated sustaining means, power means for operating said drum to effect raising and lowering of said load supporting member, and pressure variation compensating means for maintaining the counterbalancing effect of said fluid pressure operated sustaining means substantially constant in all positions of said load supporting member.

13. In apparatus of the class described, the combination of a load supporting member, fluid pressure operated sustaining means for counterbalancing the weight of said load supporting member and a portion of the load to be carried thereby, a closed fluid pressure system connected to said fluid pressure operated sustaining means, a drum, cables connecting said drum with said load supporting member and with said fluid pressure operated sustaining means, power means for operating said drum to effect raising and lowering of said load supporting member, pressure variation compensating means controlled by the movements of said load supporting member for maintaining the counterbalancing effect of said fluid pressure operated sustaining means substantially constant in all positions of said load supporting member.

14. In apparatus of the class described, the combination of a load supporting member, fluid pressure operated sustaining means for counterbalancing the weight of said load supporting member and a portion of the load to be carried thereby, a closed fluid pressure system connected to said fluid pressure operated sustaining means, a drum, cables connecting said drum with said load supporting member and with said fluid pressure operated sustaining means, power means for operating said drum to effect raising and lowering of said load supporting member, and means for compensating for variations in pressure in the pressure system for maintaining the counterbalancing effect of said fluid pressure operated sustaining means substantially constant in all positions of said load supporting member, said last mentioned compensating means comprising a weighted member arranged for varying the effective weight of the said load supporting member.

15. In apparatus of the class described, the combination of a load supporting member, fluid pressure operated sustaining means for counterbalancing the weight of said load supporting member and a portion of the load to be carried thereby, a closed fluid pressure system connected to said fluid pressure operated sustaining means, a drum, cables connecting said drum with said load supporting member and with said fluid pressure operated sustaining means, power means for operating said drum to effect raising and lowering of said load supporting member, and pressure variation compensating means controlled by the movements of said load supporting member for maintaining the sustaining effect of said fluid pressure operated sustaining means substantially constant in all positions of said load supporting member, said last-mentioned means comprising a pair of vertically spaced shives, a flexible member extending about the same, and weight members carried by said flexible member at spaced intervals, said flexible member being connected to said load supporting member to effect a shifting of said weights to and from opposite sides of a vertical plane extending through the axes of said shives incident to movement of said load supporting member whereby to vary the effective weight of said load supporting member.

16. In apparatus of the class described, a movable elevator platform or car, a plurality of pressure cylinders horizontally disposed and relatively immovable with respect to said platform, plungers operable in said cylinders and having one of their ends projecting beyond said cylinders, shives rotatably carried by the projecting ends of said plungers, cables extending about said shives and having one of their ends connected to said platform and their opposite ends relatively fixed with respect to said platform, a drive shaft, power means for rotating said drive shaft in opposite directions, a plurality of cable drums fixed to said drive shaft, cables on said drums, said last-mentioned cables having their free ends connected to said platform, a plurality of cylinders associated with said drums, said last-mentioned cylinders being horizontally disposed and relatively stationary with respect to said platform, a plurality of plungers operable in said last-mentioned cylinders and having one of their ends projected from said cylinders, shives carried by the projecting ends of said last-mentioned plungers, cables extending about said shives and having one of their ends connected to said drums and their opposite ends relatively fixed with respect to said platform, and a closed pressure system communicating with all of the cylinders aforesaid for imparting a platform sustaining pressure to said pistons.

17. The combination with a hatchway or the like, of a load supporting member movable in said hatchway to and from load receiving and discharging positions, means for effecting movement of said load supporting member, control mechanism for said means, a movable closure member for closing said hatchway in certain positions of said load supporting member, means for effecting movement of said closure member, and control mechanism for said last mentioned means interconnected with the control mechanism for said first mentioned means for automatic control of said closure member moving means by the control mechanism for said load supporting member moving means.

18. The combination with a hatchway or the like, of a load supporting member movable in said hatchway to and from load receiving and discharging positions, means for effecting movement of said load supporting member, control mechanism for said means, a movable closure member for closing said hatchway in certain positions of said load supporting member, means for effecting movement of said closure member, control mechanism for said last mentioned means interconnected with the control mechanism for said first mentioned means for automatic control of said closure member moving means by the control mechanism for said load supporting member moving means, and selective means for converting the control mechanisms aforesaid to independent control means for controlling said load supporting member and closure member movements independently of each other.

19. In elevator construction, the combination with a main elevator platform movable in a pit into and out of load receiving and discharging positions, of an auxiliary platform movable in said pit to occupy certain of the said main elevator platform positions upon movement of the latter therefrom whereby to close said pit, said auxiliary platform being further movable out of said pit closing position to permit return of said main elevator platform, means for moving said platforms as aforesaid, and means for automatically limiting the movements of said platforms to prevent collisions of the same.

20. Control means for elevator installations including a main elevator platform and a cooperating relatively movable pit closure platform beneath the same, comprising means for simultaneously controlling the movements of said platforms in an upward and downward direction, means for automatically limiting the extent of the upward and downward movements of said platforms, and means for automatically limiting the downward movement of said main elevator platform and upward movement of said pit closure platform to prevent impacts between said platforms.

21. Control means for elevator installations including a main elevator platform and a cooperating relatively movable pit closure platform beneath the same, comprising means for simultaneously controlling the movements of said platforms in an upward and downward direction, means for automatically limiting the upward and downward movements of said platforms, and means for automatically limiting the downward movement of said main elevator platform and upward movement of said pit closure platform to prevent impacts between said platforms, said means including a relatively movable member arranged to render the control means inoperative for downward movement of said main elevator platform and upward movement of said pit closure platform.

22. Control means for elevator installations including a main elevator platform and a cooperating relatively movable pit closure platform beneath the same, comprising means for simultaneously controlling the movements of said platforms in an upward and downward direction, means for automatically limiting the upward and downward movements of said platforms, means for automatically limiting the downward movement of said main elevator platform and upward movement of said pit closure platform to prevent impacts between said platforms, and means for establishing independent control for said platforms.

23. In an airplane carrier of the class described having a flight deck and a main or storage deck, said decks having openings therein forming an elevator pit or well extending through the said flight and main decks, an elevator platform movable into alignment with said decks, a pit closure platform movable into closed relation with respect to the well in the said main deck and affording an unobstructed continuation of said main deck for the free movement of planes across the deck, pneumatic counterbalancing means for both of said platforms including a closed pressure system, pressure operated platform sustaining plungers operatively associated with said platforms and with said system, power means for overcoming the sustaining effect of said plungers to cause lowering of said platforms, said power means being also operative for effecting elevation of said platforms, and means for moving said platforms in the event of failure of said power means, said last-mentioned means including means for varying the counterbalancing pressure in the closed pressure system.

24. In elevator construction, the combination with an upper and a lower landing level through which an elevator pit extends, of a main elevator platform movable in said pit between said levels and into alignment therewith, an auxiliary pit closure platform movable in said pit and normally positioned when in its lowermost position just below the lower level a sufficient distance to enable the main platform to assume a position in alignment with said lower level when said main platform reaches such position, said pit closure platform being further movable in its uppermost position into alignment with said lower level when said main platform is elevated, instrumentalities for elevating and lowering said main and pit closure platforms, including means for causing simultaneous movement of said pit closure platform incident to movement of said main platform, and means for causing said pit closure platform to reach the extremities of its movement in a downward and upward direction approximately simultaneously with the arrival of said main platform at the lower and upper levels, respectively.

25. In an airplane carrier of the class described having a flight deck and a main or storage deck, said decks having openings therein forming an elevator pit or well extending through said flight and main decks, an elevator platform movable into alignment with said decks, means connected to said elevator platform outside of its operative surface and out of the path of movement of the platform for suspending said platform in said pit, said platform thereby forming an unobstructed continuation of said decks when in alignment therewith, a pit closure platform movable into closed relation with respect to the well in the said main deck simultaneously with and incident to movement of said elevator platform therefrom and so supported in said well as to afford an unobstructed continuation of said main deck for free movement of planes across the deck and said closure platform, and means for raising and lowering said platforms.

26. In an airplane carrier of the class described having a flight deck and a main or storage deck, said decks having openings therein forming an elevator pit or well extending through said flight and main decks, an elevator platform movable into alignment with said decks, means connected to said elevator platform outside of its operative surface and out of the path of movement of the platform for suspending said platform in said pit, said platform thereby forming an unobstructed continuation of said decks when in alignment therewith, a pit closure platform movable into closed relation with respect to the well in the said main deck simultaneously with and incident to movement of said elevator platform therefrom and so supported in said well as to afford an unobstructed continuation of said main deck for free movement of planes across the deck and said closure platform, said pit closure platform being normally positioned below said main deck when said elevator platform is in alignment with said main deck and further positioned in alignment with said main deck when said elevator platform is in alignment with said flight deck, and means for operating said platforms for upward and downward movement of the same at different speeds whereby to effect alignment of said pit closure platform with said main deck and said elevator platform with said flight deck at substantially the same time.

27. In an elevator of the class described, a platform, main sustaining means therefor for sustaining a predetermined portion only of the weight of the platform, supplemental sustaining means for sustaining the remaining portion of the weight of the platform and a portion of the weight of the load to be carried by the platform, and power means intermediate the platform and the supplemental sustaining means operable in conjunction with said sustaining means to sustain and raise the remaining portion of the weight of the load, said power means being also operable to reduce the sustaining effect of the supplemental sustaining means on the platform to cause lowering of the platform.

BLAKE PALM.